United States Patent Office 3,313,647
Patented Apr. 11, 1967

3,313,647
PRESSURE-SENSITIVE ADHESIVE SHEETS COATED WITH A POLYVINYL ETHER PRESSURE-SENSITIVE ADHESIVE COMPOSITION CONTAINING A TACKY POLYACRYLATE
Henry P. Weymann, Bound Brook, N.J., assignor to Johnson & Johnson, a corporation of New Jersey
No Drawing. Filed Oct. 25, 1963, Ser. No. 318,837
13 Claims. (Cl. 117—122)

This invention relates to normally tacky and pressure-sensitive adhesive coated sheets and more particularly to normally tacky and pressure-senstiive adhesive coated sheets wherein the adhesive coating is a polyvinyl ether based adhesive.

Transparent pressure-sensitive adhesive coated sheets are well known and have a wide variety of uses in the home and in industry where a tape that remains substantially unseen is desired. Since such a sheet must be transparent, clear, and water white, both a backing and an adhesive coating that has and will retain these properties is required. Not all adhesive compositions provide a coating of this nature. Although rubber-base adhesives are excellent for use on pressure-sensitive tapes of varied applications, they are somewhat opaque and yellowish in color and, therefore, are not desirable for coating tapes which must be clear and transparent. Since a substantial amount of light will pass through the backing of a transparent sheet and will penetrate the adhesive coating, a substance which discolors in this manner is generally unsatisfactory.

The polyvinyl ether base adhesive compositions not only provide clear, transparent and water-white coatings but they also have superior resistance to sunlight discoloration. In addition, the polyvinyl ether adhesives are more resistant to oxidation than rubber-base adhesives. Accordingly, the polyvinyl ether base adhesives are preferred over the other classes of adhesives for use as the adhesive coating on transparent pressure-sensitive adhesive sheets.

Polyvinyl ether base adhesive masses generally comprise a blend of two or more polyvinyl ethers; however, formulations containing only one polyvinyl ether may be used. These compositions also generally contain tackifiers to increase the tackiness and adhesive qualities of the adhesive composition, plasticizers to soften the adhesive and to give it better quick-stick, and small amounts of antioxidants. Other standard components of adhesive compositions, such as titanium oxide or clay fillers, may be added when desired. Although in practice, they are generally not used in polyvinyl ether adhesives; and such opaque fillers would not be included where a clear adhesive mass is desired.

The plasticities of polyvinyl ether adhesive masses comprising the above components are usually somewhat lower than the plasticities of the polyvinyl ethers themselves, the plasticities of such masses generally being in the order of 2.0 to 2.5.

Despite their many advantages, however, polyvinyl ether adhesive masses have been deficient in one aspect. When tapes coated with such low plasticity polyvinyl ether adhesives are wound tightly in a roll, lateral mass exudation generally occurs under normal aging conditions and the sides of the roll become quite tacky. This is particularly objectionable where the tape rolls are individually wrapped as the paper in which the roll is wrapped sticks to the roll and when it is removed bits of paper remain adhered to the roll. Also, the edges of the rolled tape become sealed together. This frequently results in breakage when one attempts to unwind the tape from the roll. In addition, when the consumer picks up a roll of tape in which lateral mass exudation has occurred, the exude adhesive tends to adhere to his hands.

Plasticities are measured by placing a cylindrical pellet of adhesive mass 16 mm. in diameter and weighing 2.00 grams in a parallel plate plastometer such as a Williams plastometer made by Scott Instrument Company. The pellet and its surroundings are maintained at 100° F. and under a load of 5000 grams. The height of the pellet after 15 minutes is taken as the measurement of plasticity.

Some polyvinyl ether adhesive masses have heretofore been prepared with plasticities greater than about 2.5 which do not exude substantially under normal aging conditions. These, however, have not had good quick-stick and have generally had a relatively hard and resinous consistancy. As a result, when used, they generally did not give tapes with good pressure-sensitive adhesive properties.

It is an object of this invention to provide normally tacky and pressure-sensitive polyvinyl ether adhesive compositions which have a good balance of adhesive and cohesive properties and which when coated on a backing and the resulting sheet wound tightly on itself in roll form has substantially improved resistance to mass exudation. Other objects and advantages of this invention will become apparent from the following description wherein are set forth by way of illustration and example certain embodiments thereof.

It has now been discovered that the above object is obtained and lateral mass exudation of polyvinyl ether adhesive compositions is substantially controlled or prevented by adding to the polyvinyl ether adhesive compositions small amounts of tacky polyacrylates which are derivatives of aliphatic alcohols containing from about 2 to 12 carbon atoms, such polyacrylates themselves being suitable for use as pressure-sensitive adhesive coatings.

The polyvinyl ether adhesive mass provides the composition with its basic adhesive properties. Almost any polyvinyl ether which by itself possesses pressure-sensitive adhesive properties may be used in practicing the present invention. These ethers usually include: polyvinyl ethyl, polyvinyl propyl, polyvinyl normal butyl and polyvinyl isobutyl ethers. The preferred polyvinyl ethers are those having plasticities such that polyvinyl ether adhesive masses made therefrom without the addition of the polyacrylates would have plasticities of from about 2.0 mm. to about 2.5 mm.

The polyacrylates added to the polyvinyl ether adhesive compositions, in practicing the present invention, are those pressure-sensitive, tacky polyacrylate polymers which are derivatives of aliphatic alcohols containing from 2 to 12 carbon atoms. Those acrylates which are derivatives of alcohols containing from about 4 to 9 carbon atoms are preferred. A typical example of a preferred polyacrylate is that sold under the trade name "Rezyn 26-2404." This is a pressure-sensitive and tacky acrylate copolymer containing as parts by weight about 60% 2-ethylhexyl acrylate and about 40% vinyl acetate and having a Williams plasticity of 1.65 and a Brookfield viscosity of about 500 centipoises using No. 3 spindle at 60 r.p.m. in a solution containing 40% solids, the solvent being a mixture of 3 parts ethyl acetate and 1 part toluene.

Surprisingly small amounts of these polyacrylates are effective in inhibiting lateral mass exudation; and it is generally preferred to use from about 0.5 part by weight to 5 parts by weight for every 100 parts by weight of polyvinyl ether, particularly where clear adhesives are desired. However, this invention is not limited to such preferred minimum concentration and includes control of exudation through the addition of the polyacrylate in effective amounts as low as 0.1% by weight based on the polyvinyl ether. Amounts of up to 40 parts by weight of polyacrylate for every 100 parts by weight of polyvinyl ether base adhesive can be used without any deleterious effects on the properties of the polyvinyl ether adhesive mass.

The polyvinyl ether adhesive compositions containing minor amounts of polyacrylates may be coated on any conventional backing by any of the conventional methods. If a normally tacky and pressure-sensitive polyvinyl ether adhesive composition, to which small amounts of polyacrylate have been added as described herein, is coated on a backing and the backing is wound tightly in a roll, no lateral mass exudation occurs under normal aging conditions; i.e., after such aging at room temperature for 3 to 6 months, the pressure-sensitive adhesive sheet still exhibits a good balance of adhesive and cohesive properties and is clear, transparent and water white.

A surprising side effect of the addition of minor amounts of the polyacrylate to the polyvinyl ether adhesive is that the plasticity of the adhesive mass is substantially increased and generally is increased to a level which is considerably higher than that of the polyacrylate which has been added. This increase in plasticity is obtained without any appreciable loss in quick-stick properties.

The invention will be further illustrated in greater detail by the following examples. These examples are given only for the purpose of illustration and the invention should not be construed as limited thereto.

*Example I*

A normally tacky and pressure-sensitive polyvinyl ether base adhesive composition consisting of 50 parts by dry weight of a polyvinyl ethyl ether having a plasticity of 3.18 ("EDBN—Union Carbide), 50 parts by weight of a polyvinyl ethyl ether liquid ("EDBC—Union Carbide) (the polyvinyl ethyl ether liquid has a reduced viscosity at 70° C. of .3, the reduced viscosity being the difference in viscosity between the viscosity of the solution and of the solvent divided by a factor equaling the concentration times the viscosity of the solvent, the concentration being .1 gram polyvinyl ethyl ether per 100 cc. of benzene solvent), 12.5 parts by dry weight of a glycerol ester of hydrogenated rosin tackifier (Stabelite Eester-10—Hercules Chemical Company), 2.0 parts by dry weight of a dimethoxyethyl phthalate plasticizer (Methox—Union Carbide), and 1.2 parts by dry weight of a 2,5 ditertiary amyl hydroquione antioxidant (Santovaar-A—Union Carbide) is prepared at 15% solids in a toluene solution.

A tacky copolymer acrylate of about 60 parts by weight ethyl acrylate and 40 parts by weight vinyl acetate and having a plasticity of 2.31 (Catalin–A–1120—Catalin Corporation) is added to several samples of the above polyvinyl ethyl ether adhesive solution in the amounts shown in Table I, and portions of the resulting adhesive compositions are then knife-coated at a dry coating weight of 1.5 oz. per square yard on a flexible clear polyester backing. The solvent is then removed by drying at elevated temperature to leave a thin film of the pressure-sensitive adhesive coating thereon. The coated tape strips thus formed are wound tightly into rolls. After aging the rolls for six months at room temperature, the extent of lateral mass exudation is noted. Serious mass exudation occurs in the roll of tape coated with the adhesive composition A (see Table I), which does not contain any polyacrylate; while little mass exudation occurs in the rolls coated with the compositions B through F, which contain various amounts of the polyacrylate copolymer. All of the tapes retain a good balance of quick-stick, cohesive strength and adhesion. The tapes coated with the compositions containing higher amounts of polyacrylate are found to be slightly hazy after aging as compared to those containing the lower amounts of acrylate copolymer.

Samples of each solution are air-dried and their plasticities are measured on a Williams plastometer as previously described. These results are reported in Table I. The compositions containing the polyacrylate copolymer have plasticities which are substantially greater than that of either the polyvinyl ethyl ether adhesive mass or the polyacrylate copolymer alone, the maximum plasticity being obtained with only about 1.5 parts by weight of the acrylate.

TABLE I

| Composition | Composition (parts by weight) | | | | | |
| --- | --- | --- | --- | --- | --- | --- |
| | A | B | C | D | E | F |
| Polyvinyl ethyl ether adhesive mass | 100 | 100 | 100 | 100 | 100 | 100 |
| Polyacrylate (60% ethyl acrylate copolymerized with 40% vinyl acetate) (Catalin A–1120) | | 1.2 | 6.1 | 12.2 | 18.3 | 30.4 |
| Plasticity (height in mm.) | 2.39 | 2.87 | 2.74 | 2.72 | 2.56 | 2.59 |

*Example II*

Acrylate resin, "Rezyn 26–2404," previously described, is added to several samples of polyvinyl ethyl ether adhesive solution prepared as described in Example I in the amounts shown in Table I. The resulting adhesive compositions are then coated on a backing, wound tightly in roll form and aged in the same manner as described in Example I. Serious mass exudation occurs in the roll of tape coated with composition G, which composition does not contain the polyvinyl ether adhesive; while little mass exudation occurs in the rolls of tape coated with compositions H and I, which consist of the polyvinyl ether adhesive with small amounts of the acrylate. The adhesive sheets retain a good balance of quick-stick, cohesive strength, and adhesion.

The plasticities of the various adhesive compositions are measured on a Williams plastometer as previously described and the results are reported in Table II. The compositions containing the polyacrylate have plasticities which are substantially greater than that of the polyvinyl ethyl ether adhesive mass or the 2-ethylhexyl polyacrylate.

TABLE II

| Composition | Composition (parts by weight) | | |
| --- | --- | --- | --- |
| | G | H | I |
| Polyvinyl ethyl ether adhesive mass | | 100 | 100 |
| Polyacrylate (60% ethylhexyl acrylate copolymerized with 40% vinyl acetate (" Rezyn 26–2404") | 100 | 1.3 | 12.9 |
| Plasticity (height in mm.) | 1.65 | 2.74 | 2.54 |

Tables I and II are based on parts by weight of polyacrylate per 100 parts by weight of polyvinyl ether adhesive mass before addition of the acrylate. It is apparent that the 1.2 and 12.9 parts would be 1.4 parts and 14.9 parts by weight of the polyacrylate per 100 parts by weight of the polyvinyl ether.

Although several specific examples have been given illustrating the practice of the present invention, the invention should not be construed as limited thereto.

In view of the foregoing disclosure, variations or modifications thereof will be apparent; and it is intended to include within the invention all such variations and modifications except as do not come within the scope of the appended claims.

Having thus described my invention, I claim:

1. A pressure-sensitive adhesive coated sheet containing on at least one side thereof a polyvinyl ethyl ether pressure-sensitive adhesive composition consisting essentially of from about 1.4 parts by weight to about 14.7 parts by weight of a normally tacky polyacrylate per 100 parts by weight of polyvinyl ether, said polyacrylate being a derivative of an aliphatic alcohol containing from 2 to 8 carbon atoms copolymerized with vinyl acetate.

2. A normally tacky and pressure-sensitive adhesive sheet of claim 1 in which said acrylate polymer is a copolymer of 2-ethylhexyl acrylate and vinyl acetate.

3. A normally tacky and pressure-sensitive adhesive sheet of claim 2 in which said copolymer contains about 60% 2-ethylhexyl acrylate and about 40% vinyl acetate.

4. A normally tacky and pressure-sensitive adhesive sheet of claim 1 in which said polyacrylate is a copolymer of ethyl acrylate with vinyl acetate.

5. A normally tacky and pressure-sensitive adhesive sheet of claim 1 in which the plasticity of the polyvinyl ether adhesive composition, prior to blending with the polyacrylate, is from about 2.0 to about 2.5 mm.

6. A pressure-sensitive adhesive coated sheet of claim 1 in which said polyacrylate is present in an amount of no greater than about 5.0 parts by weight per 100 parts by weight of polyvinyl ether.

7. A pressure-sensitive adhesive coated sheet of claim 2 in which said polyacrylate is present in an amount of no greater than about 5.0 parts by weight per 100 parts by weight of polyvinyl ether.

8. A normally tacky pressure-sensitive adhesive coated sheet containing on at least one side thereof a polyvinyl ether pressure-sensitive adhesive composition containing from about 1.4 parts by weight to about 14.9 parts by weight of a normally tacky polyacrylate per 100 parts by weight of polyvinyl ether, said polyacrylate being a derivative of an aliphatic alcohol containing from 2 to 8 carbon atoms copolymerized with vinyl acetate and said polyvinyl ether adhesive composition being based on polyvinyl ethers having from 2 to 4 carbon atoms on each side of the ether functional group and having a plasticity of from about 2.0 mm. to about 2.5 mm. prior to the addition of said polyacrylate.

9. A normally tacky and pressure-sensitive adhesive sheet of claim 8 in which said polyacrylate is a copolymer of 2-ethylhexyl acrylate and vinyl acetate.

10. A normally tacky and pressure-sensitive adhesive sheet of claim 9 in which said copolymer contains about 60% 2-ethylhexyl acrylate and about 40% vinyl acetate.

11. A normally tacky and pressure-sensitive adhesive sheet of claim 8 in which said polyacrylate is a copolymer of ethyl acrylate and vinyl acetate.

12. A pressure-sensitive adhesive coated sheet of claim 8 in which said polyacrylate is present in an amount of no greater than about 5.0 parts by weight per 100 parts by weight of polyvinyl ether.

13. A pressure-sensitive adhesive coated sheet of claim 7 in which said polyacrylate is present in an amount of no greater than about 5.0 parts by weight per 100 parts by weight of polyvinyl ether.

References Cited by the Examiner
UNITED STATES PATENTS

| | | | |
|---|---|---|---|
| 2,311,249 | 2/1943 | Powell | 260—32 |
| 2,415,901 | 2/1947 | Nelson et al. | 117—122 |
| 2,697,084 | 12/1954 | Eger | 260—27 |
| 2,795,515 | 6/1957 | Lavanchy | 117—72 |
| 2,861,899 | 11/1958 | Sylvester et al. | 117—103 |
| 2,866,772 | 12/1958 | Sellers | 260—45.5 |
| 2,964,422 | 12/1960 | Bergstedt et al. | 117—76 |
| 2,965,592 | 12/1960 | Ethier et al. | 117—122 X |
| 3,061,459 | 10/1962 | Bader | 117—75 |
| 3,189,581 | 6/1965 | Hart et al. | 117—122 X |

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,313,647    April 11, 1967

Henry P. Weymann

It is hereby certified that error appears in the above numbered patent requiring correction and that the said Letters Patent should read as corrected below.

Column 3, line 58, for ""EDBN-Union Carbide" read -- "EDBN"-Union Carbide --; line 59, for ""EDBC-Union Carbide" read -- "EDBC"-Union Carbide --; column 3, line 67, for "Eester" read -- Ester --; column 5, line 19, for "14.7" read -- 14.9 --.

Signed and sealed this 14th day of November 1967.

(SEAL)
Attest:

Edward M. Fletcher, Jr.
Attesting Officer

EDWARD J. BRENNER
Commissioner of Patents